Patented Aug. 28, 1945

2,383,709

UNITED STATES PATENT OFFICE 2,383,709

GLASS ELECTRODE AND METHOD

Henry H. Cary, South Pasadena, and Warren P. Baxter, Pasadena, Calif., assignors to National Technical Laboratories, South Pasadena, Calif., a corporation of California No Drawing. Application August 2, 1940, Serial No. 349,860

13 Claims. (Cl. 204—1)

This invention relates to glass electrodes, their composition, and use.

Glass electrodes, as commonly used in the art to determine ionic concentrations and, more particularly, hydrogen ion concentrations, comprise essentially a thin membrane of ion-sensitive glass having not too high an electrical resistance, one surface of the membrane being adapted to contact the solution which it is desired to test, and the other surface of the membrane being in contact with an electrically-conducting medium of constant or reference characteristics. Under these circumstances, a potential may arise across the membrane and between the two surfaces, and the value of this potential is a function of the ion concentration, more particularly the hydrogen ion concentration, of the external solution being tested. The hydrogen ion concentration, or its more commonly referred to negative logarithm, the pH value of the solution, may then be determined by measurement of the indicated potential.

In usual practice, the measurement of the potential is made by potentiometric means in conjunction with a vacuum tube amplifier as a null detector since the use of a galvanometer or other current-responsive device as a null detector requires a lower membrane resistance than is normally compatible with rugged physical strength. The membrane is usually formed as a small bulb blown of a special electrode glass and sealed to a supporting or body tube of another type of glass especially selected for its qualities of high electrical resistance. Usually, the interior of the bulb is filled with a filling or reference solution of constant pH into which a metallic conducting electrode is introduced, for purposes of electrical connection to the circuit.

The measurement of pH by the use of such glass electrodes is so rapid, accurate, and convenient that this type of instrument has found widespread utility in all of the arts. The glass electrode, however, is relatively expensive to construct, and its economical usage requires that it have a long effective life.

The life of a glass electrode depends on its conditions of use and is very much shortened at elevated temperatures, particularly in acidic solutions. At a pH of about 4, the usual glass electrode has a life of about two years at temperatures below 40° C., but this life is shortened to about three months at 60° C., one week at 80° C., and to not more than a few days at 100° C. Under more acidic conditions, the life is still further shortened. These life figures are representative for electrodes in which the glass membrane is made of Corning 015, a trade name for a glass generally accepted as standard in the construction of glass electrodes and containing about 21.4 mol per cent of $Na_2O$, 6.4 mol per cent of $CaO$, and 72.2 mol per cent of $SiO_2$.

An electrode glass, that is, a glass which is used for construction of the conducting glass membrane, is normally selected on the basis of many specifications unique to its intended use; its surface potential must be rapidly and reproducibly responsive to changes of pH of the solution with which it is in contact and should not be unduly sensitive to other cations such as $Na+$; its electrical resistance should be sufficiently low that the developed potential may be readily measured in a circuit including the glass membrane as a conducting element; and the membrane should also display other desirable features, such as a low tendency toward polarization, etc.

It was hitherto thought that the rapid deterioration of glass electrode membranes at elevated temperatures was inherent in any membrane otherwise adapted for use as a conducting element. In general, there has been no suitable electrode available for high temperature work. Accordingly, the use of glass electrodes for continuous pH indication or control has been largely restricted to measurements on solutions at room temperatures or at temperatures not greatly in excess of 50° C., except where the values involved were such as to bear the cost of frequent electrode replacement. This constitutes a great drawback because, in the majority of industrial operations in which pH control is of benefit, the processing takes place at elevated temperatures.

It is a principal object of the present invention to provide a slow aging glass electrode capable of dependable continuous operation for long periods of time at elevated temperatures.

In accordance with this invention, the above and other objects are attained by means including the manufacture of the glass membrane from glass of selected composition as presently to be described.

The advantages resulting from the present invention are many and include the provision of an improved glass electrode having an effective life in continuous use of over one year under high temperature conditions requiring electrode replacements weekly or oftener when employing the described conventional electrodes.

A detailed description of the invention may well be prefaced by a discussion of the effects of aging as determined in our study of this subject.

As indicated above, when solutions of different pH are placed in contact with the inner and outer surfaces of the glass membrane and proper electrical precautions are taken, it is found that an electric potential difference exists between the two solutions. This potential difference varies with changes in pH of the inner and outer solutions and may be expressed by the following formula over a limited range of pH values:

$$E = A + (.00019832)\,T(pH_1 - pH_2)$$

Where E is the potential of the inner solution with respect to the outer solution, $pH_1$ is the pH of the outer solution and $pH_2$ is the pH of the inner solution, and T is the absolute temperature in degrees Kelvin.

The term A in the above relation is a characteristic of the particular electrode used; it varies from electrode to electrode, even under conditions of identical manufacture, and usually varies in a given electrode with age and usage. This term ranges in value from a few millivolts to twenty millivolts or more, and is commonly referred to as the asymmetry potential of the electrode.

The observed potential E may be regarded as having its origin in the difference between a potential arising at the reference electrode surface which is in contact with the reference solution and a potential arising at the test electrode surface which is in contact with the solution to be tested. Thus viewed, the asymmetry potential as represented by the term A is apparently related to differences in activity as between the reference and test electrode surfaces of the glass electrode.

The asymmetry potential of the glass electrode introduces a complication in practical pH measurement since it is necessary to evaluate it in some manner before the potential measurements of the electrode can be interpreted in terms of the pH of the solutions with which it is in contact. In practice, this usually is accomplished by calibrating the electrode against solutions of accurately known pH.

Under conditions conducive to rapid aging of the glass electrodes, we find that the asymmetry potential may fluctuate widely and rapidly. For example, when one surface of the usual glass electrode is maintained in continuous contact with a boiling solution of dilute acid, the asymmetry potential may change by more than 20 millivolts per day. Under such conditions, the electrode must be incessantly re-calibrated if it is desired to determine the pH with any degree of accuracy. This fluctuation in asymmetry potential appears to be resultant or concomitant of aging since, under conditions which do not lead to rapid aging, for example, immersion in a neutral or alkaline solution at room temperature, the change in asymmetry potential with lapsed time is quite low and may amount to no more than a few millivolts per month.

The potential E, as expressed in the above relation, is essentially an equilibrium potential. With a fresh electrode, equilibrium may be reached in a fraction of a second. However, as aging progresses, for example, as by continued immersion in a hot boiling solution of dilute acid, the electrode becomes more and more sluggish in responding to changes in pH so that, after a day or so of boiling, the usual electrode will not correctly indicate the pH unless an undue time is allowed for it to come to equilibrium. When an electrode has reached a certain degree of sluggishness at the elevated temperature, its usefulness is at an end and it cannot then be salvaged even for low temperature work since, at low temperatures, the spent electrode will be found to be even more sluggish in its response.

As a practical matter, the aging of an electrode surface to the degree that it becomes unduly sluggish and retarded in response is of most detriment in the case of the test surface which is in contact with solutions subject to pH changes. As a rule, the environment of a control or reference surface is relatively constant, particularly when a solution of buffered pH is employed as the reference solution, so that sluggishness of the reference surface is normally not an important factor.

In addition to the electrical effects associated with aging, including the described fluctuations in asymmetry potential and modifications of the electrode surfaces leading to sluggish response, the constituent glass of the aged electrode membrane becomes chemically and physically disintegrated, finally culminating in a complete mechanical failure of the membrane. Accordingly, even if no great accuracy is desired in the pH measurement, the attempt to use the conventional-type electrode for a period in any substantial excess of the life periods as above-indicated leads to cracking and complete mechanical failure of the electrode membrane.

It will be understood that the word "aging" as herein-used is not intended to be indicative of the lapse of a definite amount of chronological time but rather of the growth with time of the described deteriorations, which growth may have various rates under varying conditions of usage. In particular, we find the rate of aging to depend very strongly on the conditions of temperature and the nature of the chemical solutes in the solution with which the electrode is in contact.

In general, an increase in temperature exerts a very substantial increase in rate of aging, and, from a wide variety of different experiments, we conclude that the rate of aging may be regarded as increasing from three to four times for each 10° rise in centigrade temperature. Accordingly, the effects of aging are primarily evidenced at the more elevated temperatures.

We find, further, that the rates of aging are dependent on hydrogen ion concentration, and that the lower the pH value the more rapidly aging progresses. Accordingly, the degradation of conventional glass electrodes is frequently so rapid when used to test hot acidic solutions as to render their use completely impractical.

It is frequently advantageous to employ glass electrodes having an acidic reference solution, this solution being normally sealed in contact with the reference surface of the glass membrane. Such acidic solutions, for example, are used to advantage in connection with certain metallic electrodes employed for electrical connection to an exterior circuit. Hitherto, however, the use of acid-filled electrodes has been restricted to relatively low temperatures because of the aging effects at the reference surface induced by the acidic filling solution, entirely apart from any change in characteristics which may take place on the test surface.

Solutes other than hydrogen ion may also serve to accelerate very greatly the rate of aging of membranes in contact with such solutes. This is particularly true of materials adapted to form insoluble compounds with calcium ion, in particular various phosphates.

The present invention is based, in part, on our discovery that the rate of aging is very closely and critically associated with the sodium oxide content of the glass membrane, and that, among sodium calcium silicate glasses, the glasses containing less than about 19 mol per cent of sodium oxide show very substantial resistance toward aging and its concomitant effects, as compared with the aging of glasses containing sodium oxide in appreciable excess of of 19 mol per cent.

We have further established that, for best results and for longer life at elevated temperatures or under other conditions conducive to rapid aging, the silicate glass should also contain substantial quantities of calcium oxide, preferably in excess of about 7 mol per cent.

Of the glasses containing less than 19 mol per cent of sodium oxide and more than 7 mol per cent of calcium oxide, we normally prefer to employ for construction of electrode membranes a glass containing about 12½ mol per cent calcium oxide, 17 mol per cent of sodium oxide, and 70.5 mol per cent of silicon dioxide. Membranes of substantially the indicated composition are not only adapted for long service at elevated temperatures but also display to a completely satisfactory degree various other qualities which are advantageous in an electrode glass.

We have found that membranes constructed of calcium sodium silicate glasses containing less than about 19 mol per cent of sodium oxide, and, in particular, glasses of the preferred composition, are resistant toward all of the effects of aging, whether the aging be due primarily to usage at high temperatures or to usage in acidic or other types of solutions conducive to aging, or both. Even after protracted use under very severe conditions, the electrode surfaces provided by a membrane constructed from the indicated glasses will remain mechanically unimpaired and will respond rapidly to changes in pH. Also, the asymmetry potential of the electrode as a whole will be found to have changed but slightly.

The longevity of the membrane may be improved to a degree that is truly surprising in view of the relatively small change effected in composition. Thus, for example, the principal difference between Corning 015 and our preferred glass is a reduction in the sodium oxide content from about 21.5 mol per cent to about 17 mol per cent, but, as a result of this change, an extraordinary increase in longevity is obtained. In a solution of pH 4 at 80° C., the effective life of an electrode of Corning 015 glass is about one week, whereas the effective life of the improved electrode is well over one year. In the same solution at 100° C., the life of the electrode of Corning 015 glass is about two days, whereas the improved electrode has an effective life of well over two months. These figures are very conservative and, in practice, the factor of improvement is usually found to be about 10,000 per cent.

As a result of this greatly extended life at elevated temperatures, the improved electrode permits the use of glass electrodes for economical and accurate pH control and indication in all types of high temperature processes. In particular, the improved electrode may be permanently installed in contact with a batch or continuous stream of hot liquid to provide a continuous or continual indication of pH extending over a period of months or years without the necessity for replacement or frequent calibration, even though the temperatures involved extend to 100° C. or higher. The improved electrode thus permits of the general application of glass electrodes for pH determinations in high temperature processing operations, which high temperature operations, in spite of their paramount importance in the various industries, have hitherto remained inaccessible to accurate and inexpensive pH control.

It will be appreciated that a number of other benefits also derive from the present invention, including the feature of unimpaired efficiency of the improved electrode when used in solutions containing substantial quantities of hydrogen ion, or containing anions adapted to form insoluble compounds with alkaline earth metals, and in permitting the use of acidic filling solutions in sealed-type electrodes without detriment to the high temperature operation of the electrodes, and in other similar features.

The improved electrode is essentially one in which the conducting glass membrane is selected from glasses of the indicated compositions but, for its efficient manufacture and use, the following points are of consequence.

For the most part, the preferred glasses have a relatively high softening point, and care should be taken in the manufacture of electrodes that a satisfactory seal is formed with the relatively lower softening point, high resistance glass which is normally used as a body or supporting tube. For best results, the electrode glass is maintained in a thoroughly molten condition, as in a heated platinum crucible, and the open end of the supporting tube brought into uniform contact with the surface of the molten electrode glass, withdrawn with an adhering droplet of the molten glass in sealing relationship to the tube, and then cooled slightly to permit the electrode glass to fall to working temperature, at which point the droplet may be blown out into a thin-walled bulb perfectly sealed to the supporting tube. This preferred method of manufacture is described in greater detail in our copending application, entitled "Glass electrode and method of making same," Serial No. 349,859, now Patent No. 2,346,470, granted April 11, 1944.

The low soda glasses herein-employed have a relatively high specific resistance which, however, rapidly drops off with increasing temperature so that their resistance is reasonably low at the elevated temperature of intended use.

The effective resistance of the electrode membrane is a function of the surface area and thickness of the membrane, as well as of the specific resistance of the glass from which it is manufactured. In conventional practice, the dimensional variables are normally adjusted to give an electrode resistance of from 50 to 150 megohms at room temperature (25° C.) or occasionally as high as 400 or 500 meghoms if a high quality potentiometric instrument requiring but little current for operation is available for measurement of the potential developed across the membrane.

For our improved high temperature electrode, we prefer to use an electrode membrane of the indicated composition and having such thickness and surface area as to have a resistance at room temperature (25° C) in excess of 1000 megohms, typically from 3000 to 4000 megohms. Practically speaking, that is, with regard to commercially available measuring circuits, such an electrode is not operative at room temperature. We prefer further to adjust the dimensional variables of area and thickness so that the resistance of the electrode, which decreases rapidly with increasing temperature, is below 500 megohms at 60° C. and preferably below 500 megohms at about 50°

C. Electrodes conforming to these conditions may accordingly be regarded as practically operative only at elevated temperatures, i. e., at temperatures at or above the indicated temperatures of 50 to 60° C.

Electrodes of smaller resistance may also be employed by using a bulb of increased area or diminished wall thickness, but such electrodes are generally mechanically fragile or unduly large, or both. Another disadvantage of the lower resistance electrodes, which may become apparent in measuring operations permitting the flow of current through the membranes, is that with reduced resistance a proportionately larger current is transferred across each unit area of the electrode surface. If this current is permitted to become too large as by the use of an electrode of relatively low resistance, polarization effects may occur during the potential measuring operations.

In general, in order to suppress current drain and polarization effects, the electrodes are best employed with potentiometric measuring circuits requiring but little current for their operation, as described in Beckman, et al., United States Patent No. 2,058,761, and in the copending application of H. H. Cary, entitled "Automatic voltage and pH indicator," filed December 6, 1938, Serial No. 244,210, now Patent No. 2,232,211, granted Feb. 18, 1941. However, with the observation of obvious precautions, the potential of the improved electrode may be accurately measured by other conventional-type instruments.

It will be understood that the details of the above description are intended as exemplary rather than limiting, and that various modifications of the described electrode and method may be employed without departing from the essence of our invention as defined by the scope of the appended claims.

We claim as our invention:

1. A slow-aging glass electrode capable of operating for prolonged periods of time at elevated temperatures, which electrode includes: an ion-sensitive electrode surface composed of a sodium-calcium-silicate glass membrane containing not more than about 19 mol per cent of sodium oxide, the surface area and thickness of said membrane being such that the electrical resistance of said membrane is in excess of 3000 megohms at 25° C. and below 500 megohms at 60° C., whereby at elevated temperatures the effective resistance is sufficiently low to admit ready measurement of a potential difference across said membrane.

2. A high temperature, slow-aging glass electrode capable of continuous operation for prolonged periods of time in contact with hot acidic solutions having a temperature above 50° C., while experiencing during such use only slight changes in asymmetry potential and time required to reach equilibrium potential, which electrode includes: a conductive glass membrane composed of sodium-calcium-silicate glass containing not more than about 19 mol per cent of sodium oxide and not less than about 7 mol per cent of calcium oxide, the conductive glass membrane of the indicated composition having such thickness and surface area as to have an electrical resistance in excess of 3000 megohms at 25° C., and below 500 megohms at 60° C.

3. In combination in a glass electrode capable of operating for prolonged periods at an elevated temperature in excess of 50° C.: a glass membrane having a reference surface adapted for contact with a reference filling solution and a test surface adapted for contact with a solution to be tested, said membrane consisting of a sodium-calcium-silicate glass containing not more than 19 mol per cent of sodium oxide and not less than 7 mol per cent of calcium oxide, said glass being resistant to the aging effects of acidic solutions even at such elevated temperature in excess of 50° C., the surface area and thickness of said membrane being such that the electrical resistance between said reference surface and said test surface is in excess of 3000 megohms at 25° C. and below 500 megohms at said elevated temperature in excess of 50° C.; and a reference filling solution permanently sealed in contact with at least a portion of said reference surface.

4. A glass electrode adapted to operate at elevated temperatures, which electrode includes a conductive glass membrane having a resistance in excess of 1000 megohms at 25° C. and a resistance not greater than 500 megohms at 60° C., said glass membrane being composed of approximately 12.5 mol per cent of CaO, 17 mol per cent of $Na_2O$, and 70.5 mol per cent of $SiO_2$.

5. A method for the continuous determination of pH of solutions at elevated temperatures in excess of about 50° C. and for a prolonged period of time, which comprises: continuously contacting said solution for a prolonged period of time with one surface of a conducting glass membrane having a resistance in excess of 1000 megohms at 25° C. and below 500 megohms at the temperature of said solution, said glass membrane being composed of a sodium-calcium-silicate glass containing sodium oxide in amount not more than about 19 mol per cent and containing calcium oxide in amount not less than about 7 mol per cent; maintaining the other surface of said membrane in contact with an electrically-conducting reference material; and using the potential developed between said solution and reference material to indicate the pH value of the solution.

6. A method of measuring the pH of solutions over a protracted period of time and at an elevated temperature in excess of about 50° C., which comprises: contacting the solution while at such elevated temperature in excess of about 50° C. with one surface of a thin glass membrane having a second surface in contact with a reference solution, said membrane being composed of a sodium-calcium-silicate glass having less than about 19 mol per cent of sodium oxide; and using variations in potential across said membrane to indicate the pH value of the hot solution.

7. A method as in claim 6, in which the selected glass has about 12.5 mol per cent of CaO, 17 mol per cent of $Na_2O$, and 70.5 mol per cent of $SiO_2$.

8. A method for the continuous determination of pH in liquid media at a temperature above about 50° C. for a prolonged period of time, which comprises: continuously contacting the liquid for a prolonged period of time while at said elevated temperature in excess of 50° C. with a glass electrode having an electrode membrane composed of a sodium-calcium-silicate glass containing not more than about 19 mol per cent of sodium oxide and not less than about 7 mol per cent of calcium oxide, said glass being resistant to effects of high temperature aging, whereby a reproducible potential is developed on said electrode surface which is rapidly responsive to the pH value of the hot liquid even after protracted exposure to said liquid; and using said potential to indicate the pH of said liquid.

9. A high-temperature glass electrode resistant to aging, due to use at high temperatures even in solutions conducive to aging, to such extent as to have an effective life of more than one year when continuously used in a solution of pH 4 at 80° C. and more than two months when in such solution at 100° C., while experiencing during such use only slight changes in asymmetry potential and time required to reach an equilibrium potential, said high-temperature glass electrode comprising a supporting tube and a thin-walled bulb sealed thereto, said bulb being composed of a sodium-calcium-silicate glass containing not more than about 19 mol per cent of sodium oxide and having an electrical resistance in excess of 3000 megohms at 25° C. and below 500 megohms at temperatures above 50° C.

10. A high-temperature glass electrode resistant to aging, due to use at high temperatures even in solutions conducive to aging, to such extent as to have an effective life of more than one year when continuously used in a solution of pH 4 at 80° C. and more than two months when in such solution at 100° C., while experiencing during such use only slight changes in asymmetry potential and time required to reach an equilibrium potential, said high-temperature glass electrode comprising a supporting tube and a thin-walled bulb sealed thereto, said bulb being composed of a sodium-calcium-silicate glass containing not more than about 19 mol per cent of sodium oxide and not less than about 7 mol per cent of calcium oxide and having an electrical resistance in excess of 3000 megohms at 25° C. to be practically inoperative at this temperature but said resistance decreasing with increase in temperature to such extent as to be below 500 megohms at the aforesaid high temperatures of use.

11. A high-temperature glass electrode capable of prolonged use at temperatures higher than about 50 to 60° C. but which is practically inoperative at lower temperatures and which glass electrode is capable of such prolonged use in boiling solutions of dilute acids with very low changes in asymmetry potential and time required to reach an equilibrium potential, said high-temperature glass electrode comprising a supporting tube and a thin-walled bulb sealed thereto, said bulb being composed of a glass consisting of about 12.5 mol per cent of CaO, about 17 mol per cent of $Na_2O$, and about 70.5 mol per cent of $SiO_2$ and having an electrical resistance in excess of 3000 megohms at 25° C. but below 500 megohms at temperatures higher than about 50° C.

12. A high temperature glass electrode continuously immersible in contact with hot liquids of high temperatures above 50° C. and up to at least 100° C. to be continuously responsive to the pH of such hot liquids for a period of months at least, and experiencing during such use only slight changes in asymmetry potential and time required to reach equilibrium potential, said high temperature glass electrode comprising: an open-ended supporting tube formed of a glass having a relatively low softening point, and a thin-walled bulb of electrode glass closing the end of said supporting tube and sealed to the supporting tube, said electrode glass being composed of a sodium-calcium-silicate glass having a relatively high softening point and containing not more than about 19 mol per cent of sodium oxide and not less than about 7 mol per cent of calcium oxide, said thin-walled bulb being dimensioned in thickness and surface area to have an electrical resistance in excess of 3000 megohms at 25° C. and below 500 megohms when in contact with said hot liquids of temperatures above 50° C. and up to at least 100° C.; and a reference filling solution permanently sealed in contact with the interior of said bulb.

13. A high temperature glass electrode as defined in claim 12, in which said sodium-calcium-silicate glass has a composition of about 12.5 mol per cent of CaO, about 17 mol per cent of $Na_2O$, and about 70.5 mol per cent of $SiO_2$.

HENRY H. CARY.
WARREN P. BAXTER.